United States Patent
Wickenburg et al.

(10) Patent No.: US 12,481,832 B2
(45) Date of Patent: Nov. 25, 2025

(54) PROVIDING ITEM DISCOVERY GUIDANCE BASED ON AUTOMATICALLY-DISCERNED SUBJECTIVE CONSIDERATIONS

(71) Applicant: Artica Inc., Bellevue, WA (US)

(72) Inventors: Sebastian Wickenburg, Bothell, WA (US); David Fagnan, Shoreline, WA (US); Steven Hoelscher, Seattle, WA (US); Michael Rowell, Bellevue, WA (US)

(73) Assignee: Artica Inc., Bellevue, WA (US)

( * ) Notice: Subject to any disclaimer, the term of this patent is extended or adjusted under 35 U.S.C. 154(b) by 285 days.

(21) Appl. No.: 18/296,210

(22) Filed: Apr. 5, 2023

(65) Prior Publication Data
US 2024/0338526 A1 Oct. 10, 2024

(51) Int. Cl.
*G06F 40/30* (2020.01)
*G06F 3/04847* (2022.01)

(52) U.S. Cl.
CPC .......... *G06F 40/30* (2020.01); *G06F 3/04847* (2013.01)

(58) Field of Classification Search
CPC .............................. G06F 3/04847; G06F 40/30
See application file for complete search history.

(56) References Cited

U.S. PATENT DOCUMENTS

| | | | |
|---|---|---|---|
| 8,010,539 B2* | 8/2011 | Blair-Goldensohn | G06F 16/345 |
| | | | 707/999.005 |
| 9,646,250 B1* | 5/2017 | Indurthi | G09B 7/02 |
| 11,520,795 B2* | 12/2022 | Cho | G06Q 30/0625 |
| 11,995,411 B1* | 5/2024 | Qadrud-Din | G06F 40/40 |
| 2012/0209751 A1* | 8/2012 | Chen | G06Q 30/06 |
| | | | 705/27.2 |
| 2013/0066873 A1* | 3/2013 | Salvetti | G06Q 30/0278 |
| | | | 707/738 |
| 2015/0379018 A1* | 12/2015 | Gur | G06F 16/951 |
| | | | 707/709 |
| 2019/0318407 A1* | 10/2019 | Giridhari | G06Q 30/0627 |
| 2024/0086164 A1* | 3/2024 | Kramer | G06F 8/36 |

* cited by examiner

*Primary Examiner* — Eric Yen
(74) *Attorney, Agent, or Firm* — Seed Intellectual Property Law Group LLP

(57) ABSTRACT

A facility for assessing items in a category is described. The facility applies a large language model to textual reviews of items in the category to select portions that each mention a particular one of a list of subjective considerations relevant to the category, and performs automatic sentiment analysis on each selected portion. For each combination of an item with a subjective consideration, the facility generates a value for the subjective consideration for the item based on the sentiment analysis result for portions mentioning the subjective consideration in reviews of the item. The facility then determines for a particular user a suitability score for each item by combining the subjective consideration values for the item in a way that is based on subjective consideration importance weights specific to the user.

17 Claims, 11 Drawing Sheets consideration value table — 700

| item ID | maneuverability value | folding ease value | jogging stability value | seating position value | durability value | |
|---|---|---|---|---|---|---|
| 290314 | 1 | 10 | 2 | 9 | 9 | — 701 |
| 301923 | 9 | 2 | 8 | 5 | 4 | — 702 |
| 409381 | 6 | 5 | 7 | 4 | 3 | — 703 |
| ... | | | | | | |

PROVIDING ITEM DISCOVERY GUIDANCE BASED ON AUTOMATICALLY-DISCERNED SUBJECTIVE CONSIDERATIONS

BACKGROUND

Item discovery refers to a process in which a person who wishes to use, purchase, or otherwise select a particular item among a category of items learns about them as a basis for selecting one. An example item discovery scenario involves a person reviewing information about single-infant strollers to select one best suited to the person.

Conventional item discovery techniques involve displaying values of objective attributes for each item, and permitting a user to filter and/or sort based on these. For example, single-infant strollers have values for objective attributes such as price, brand, width, stroller weight, maximum load weight, frame material, cover material, and color. Typically, each item's manufacturer or other provider provides the value of each objective attribute for the item. A particular user could produce a list of strollers filtered to include only strollers whose color is green and whose weight is under 7 pounds, and sorted by price.

BRIEF DESCRIPTION OF THE DRAWINGS

FIG. 7 is a table diagram showing sample contents of a consideration value table used by the facility in some embodiments to store values of subjective considerations determined by the facility for each item in an item category.

DETAILED DESCRIPTION

Figure 1:
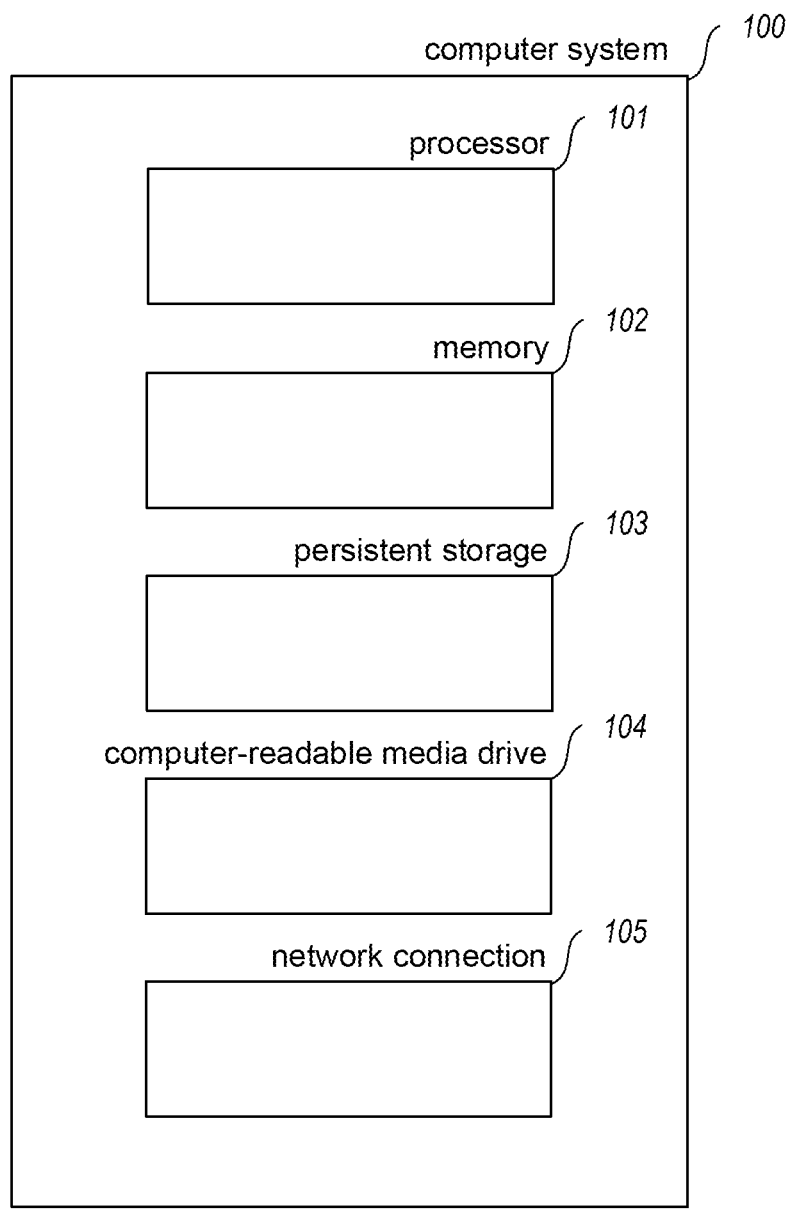
FIG. 1 is a block diagram showing some of the components typically incorporated in at least some of the computer systems and other devices on which the facility operates.

With respect to the use of conventional item discovery techniques, the inventors have recognized that items in a category may have similar objective attribute values, yet be of very different suitability levels to a particular person. For example, among strollers that are the same color and weight and have similar prices, some may be particularly easy to maneuver using one hand. Some people may value this characteristic highly, while others value it less highly. They have further recognized that such subjective considerations are not surfaced by conventional item discovery techniques.

In response to this recognition, the inventors have conceived and reduced to practice a software and/or hardware facility providing item discovery guidance based on automatically-discerned subjective considerations ("the facility").

First, the facility accesses a large number of textual natural language reviews each of one or more items in the category. In various embodiments, these can be editorial reviews, customer reviews, articles recommending the best item or items in the category, etc.

The facility then uses natural language models to automatically discern, across all of the reviews, the considerations that are mentioned most frequently, or otherwise identified as being of high importance. In some embodiments, the facility supplies the accessed reviews to a large language model like GPT-3, and requests that it identify the most important aspects of the item. In some embodiments, rather than providing the reviews, the facility simply poses the request to the large language model, identifying the item category and relying on the large language model's digestion of reviews like those accessed. In some embodiments, the facility uses a natural language transformer like BERT to project segments of each accessed review into an embedding space location, then clusters these together to identify an embedding space location representing each characteristic. In some embodiments, the facility obtains human validation and editing of considerations identified in any of these ways. Extending the example above, in some embodiments, the facility identifies the following subjective considerations for single-infant strollers: one-handed maneuverability, ease of folding and unfolding, stability when jogging, comfortable seating position, and durability.

After identifying the considerations for a category, for each item of the category, the facility attributes to the item a value of each of the category's considerations. The facility does so by selecting the reviews that address the item; for each review, for each consideration, identifying a passage of the review that corresponds to the consideration, and performing automatic sentiment analysis of the passage to determine whether it has a positive or negative sentiment. Then, for each consideration, the facility counts the number of reviews in which the consideration was mentioned with positive sentiment and those in which it was mentioned with negative sentiment, and combines these into a value of the consideration for the item. For example, if, among 11 reviews for a stroller, the passages about the maneuverability consideration in 7 of those reviews were judged to have positive sentiment and those in 3 of the remaining reviews were judged to have negative sentiment, in some embodiments the facility assigns a value of 0.7 to the maneuverability consideration for that stroller.

At this point, the facility can service item discovery requests from individual users. Ultimately, each such user request identifies a category, and provides importance weights for the considerations. In various embodiments, this information is provided for a user request in a variety of ways: the category can be selected by the user from a list, or specified in a query included in the request; the importance weights can be explicitly specified by the user as part of the request, inferred from the query, or derived from a profile maintained by the facility for the user based upon past interactions and inputs, such as those related to past requests having one or more considerations that are the same as or similar to those of the current request.

For each user request, the facility generates suitability scores for each item of the category by weighting the item's value for each consideration by the weight given to the consideration by the request, then combining these weighted consideration values. Thus, for any request, the items receiving the highest score are those with high values for the considerations highly-weighted by the request. In various embodiments, the facility shows the suitability score with each item in a list of items; sorts the list of items in decreasing order of their suitability scores; shows only items whose suitability scores exceed a threshold, etc. In some embodiments, the facility also displays the values of some or all of the considerations for each item.

By operating in some or all of the ways described above, the facility enables users to select items in a category in accordance with each user's individual priorities, based on information about important considerations and their relative fulfillment by different items that the facility automatically distills from item reviews generated for other purposes, without regard for the facility's use of them.

Additionally, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by tailoring the items shown and their presentation to make them particularly relevant and usable to the user to whom they are presented, the facility saves client and server processing resources and network traffic that would otherwise have been required to collect, process, and display more information about a larger number of items. Also, by increasing the likelihood that each user will find the item they select to be suitable, the facility decreases the likelihood that additional client and server processing resources and network traffic will later be required to select a replacement item.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
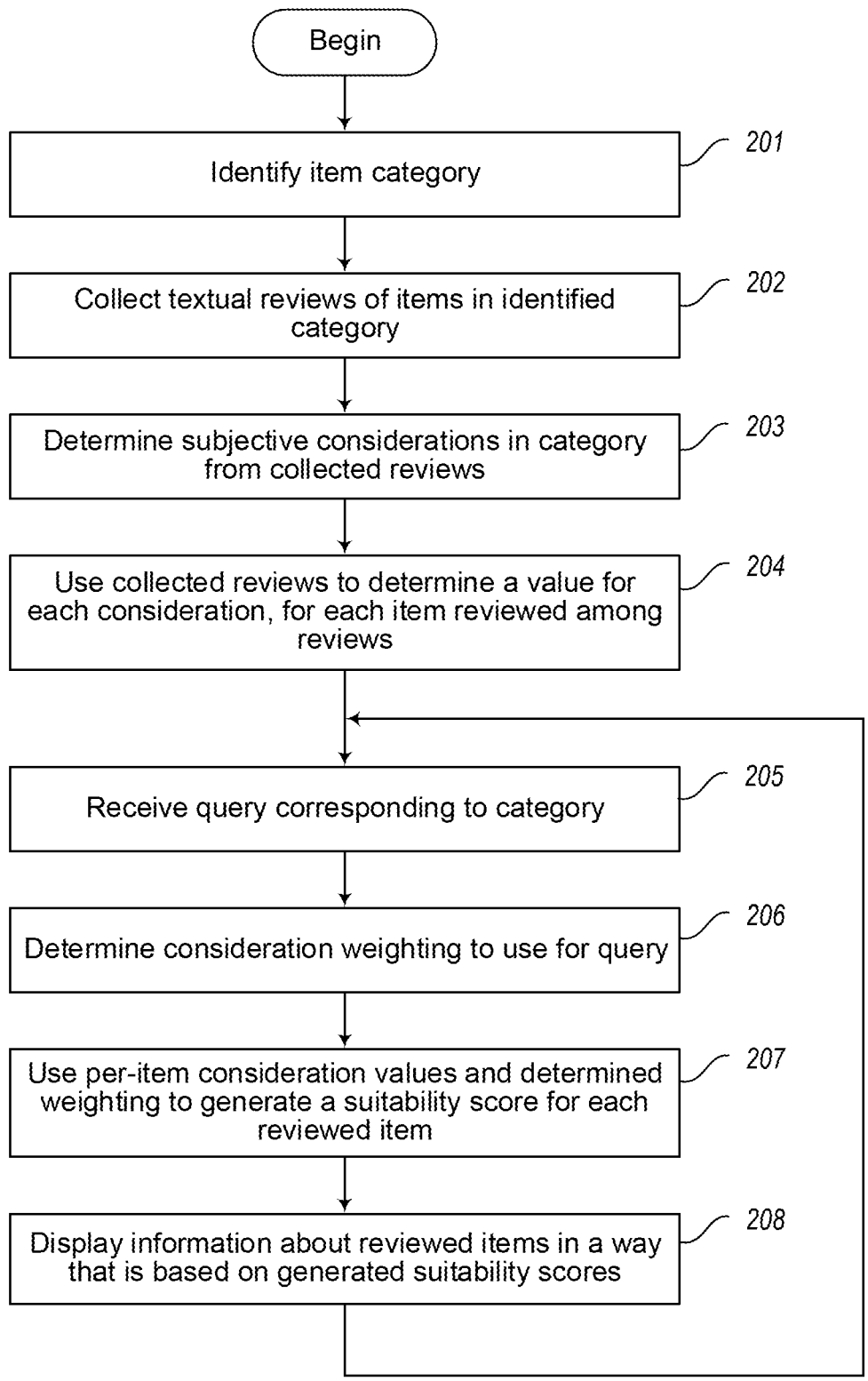
FIG. 2 is a flow diagram showing a process performed by the facility in some embodiments to generate and use item suitability scores in response to a query for items in a particular category.

FIG. 2 is a flow diagram showing a process performed by the facility in some embodiments to generate and use item suitability scores in response to a query for items in a particular category. In act 201, the facility identifies a new item category. To extend the example discussed above, the facility identifies the item category of single-infant strollers. In various embodiments, the facility performs this identification based upon human editorial input; automatic analysis of frequently purchased and/or frequently searched categories of items; etc. In act 202, the facility collects textual reviews of items in the category identified in act 201. In various embodiments, the collective reviews can be editorial reviews, customer reviews, "best of" articles for the category, etc. In some embodiments, the facility performs automatic voice transcription in order to derive textual reviews to include in the collecting from audio and/or audio/video reviews.

Figure 3:
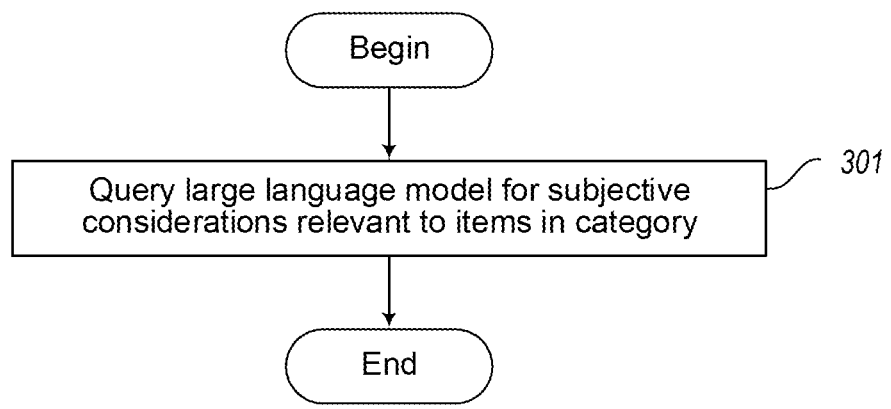
FIG. 3 is a flow diagram showing a first process used by the facility to determine a significant set of subjective considerations for items in a particular category.
Figure 4:
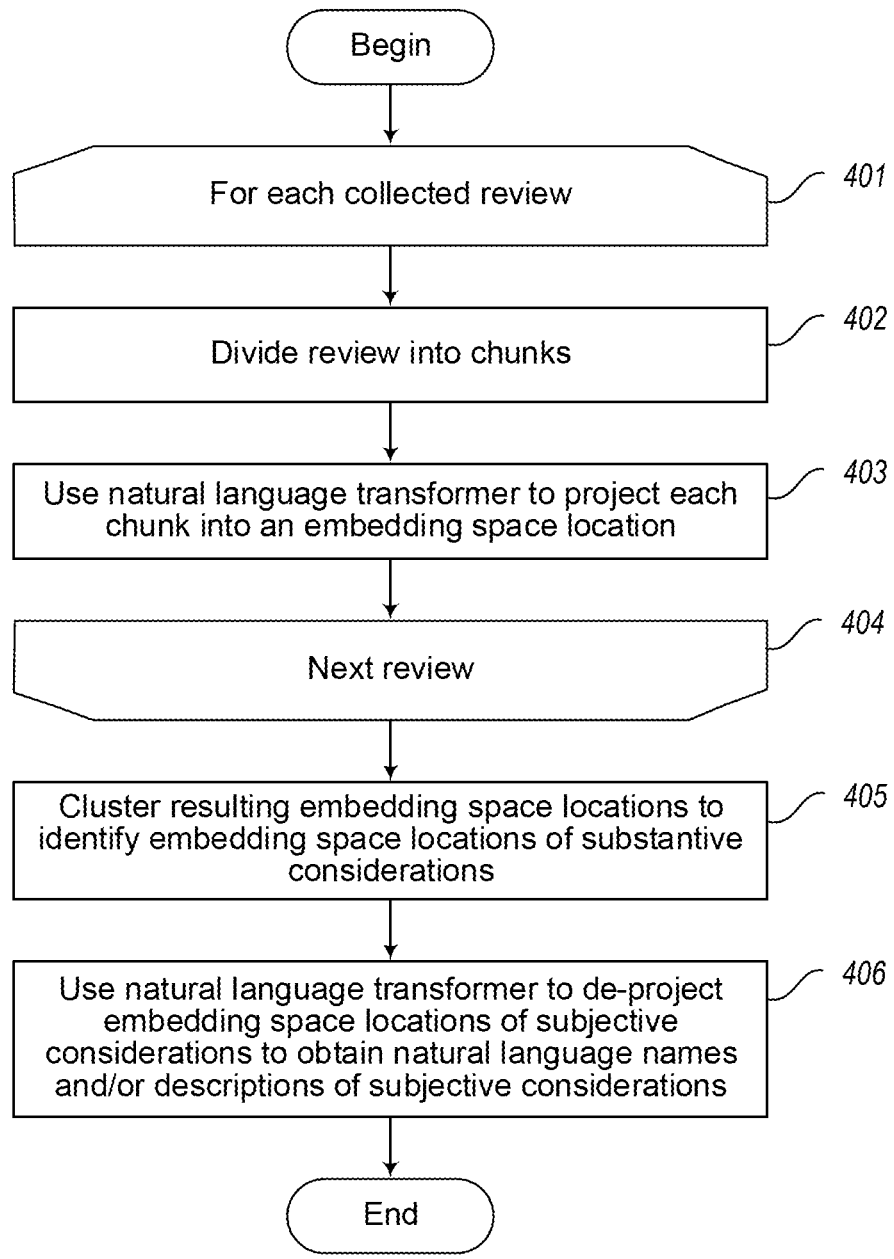
FIG. 4 is a flow diagram showing a second process used by the facility to determine a significant set of subjective considerations for items in a particular category.
Figure 5:
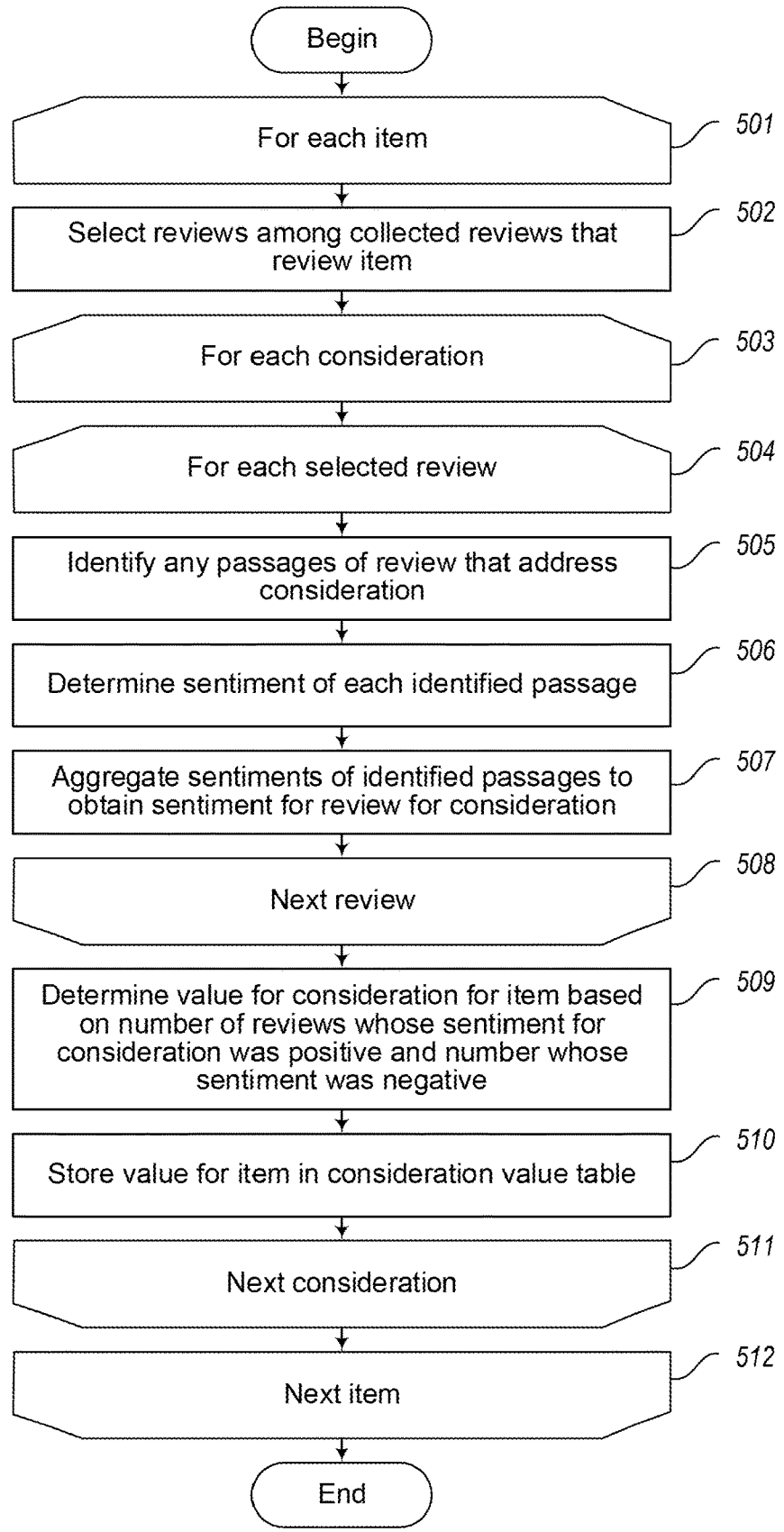
FIG. 5 is a flow diagram showing a process performed by the facility in some embodiments to determine values of the subjective considerations for each item in a category.

In act 203, the facility uses the reviews collected in act 202 to determine a set of subjective considerations that are significant to people shopping in the category. Approaches to performing act 203 used by the facility in various embodiments are shown in FIGS. 3 and 4, and discussed below. In act 204, the facility uses the reviews collected in act 202 to determine a value of each consideration determined in act 203, for each item that is reviewed among the reviews collected in act 202. One approach used by the facility in some embodiments to perform act 204 is shown in FIG. 5 and discussed in greater detail below.

In act 205, the facility receives a request corresponding to the category identified in act 201. Typically, the received request identifies this category, such as referring to it in a free-text query, or selecting it from a list of supported categories. In some embodiments, the received request is accompanied by an explicit or implicit indication of how the category's considerations are to be weighted in processing the query. In act 206, the facility determines a consideration weighting to use for the query; that is, a set of weights that represents the level of importance of each of the considerations. In various embodiments, the facility provides a specialized user interface for the user to input this consideration weighting; infers the consideration weighting from a free-text query specified by the user; infers the consideration weighting based upon earlier consideration weightings provided by the user and/or actions of other types by the user, in some cases captured in a priority profile maintained by the facility.

In act 207, the facility uses the per-item consideration values determined in act 204 and the consideration weighting determined in act 206 to generate a suitability score for each of the reviewed items. In act 208, the facility displays information about the reviewed items in a way that is based on the generated suitability scores, such as sorting these items on the basis of their suitability scores, filtering the items on the basis of their suitability scores, etc. After act 208, the facility continues in act 205 to receive another query.

Though not shown, in some embodiments, the facility performs the process shown in FIG. 2 with respect to many different item categories, and makes a determination (not shown) between acts 205 and 206 about which of these categories the received request is directed to.

Those skilled in the art will appreciate that the acts shown in FIG. 2 and in each of the flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

FIG. 3 is a flow diagram showing a first process used by the facility to determine a significant set of subjective considerations for items in a particular category. In act 301, the facility submits a query to a large language model requesting a response that identifies the subjective considerations relevant to items in the category. In some embodiments, the facility submits this query in connection with the textual reviews collected by the facility for the category. In some embodiments, the facility submits the query without the collected textual reviews, relying on the large language model's training using content similar to or that may happen to include the collected reviews. After act 301, this process concludes.

FIG. 4 is a flow diagram showing a second process used by the facility to determine a significant set of subjective considerations for items in a particular category. In acts 401-404, the facility loops through each review collected by the facility for the category. In act 402, the facility divides the review into chunks. In various embodiments, the chunks are sentences, paragraphs, or other contiguous portions of the review determined to relate to a single topic. In act 403, the facility uses a natural language transformer to project each chunk into a location in an embedding space representing the meaning and informational content of the chunk. In act 404, if additional reviews remain to be processed, then the facility continues in act 401 to process the next review, else the facility continues in act 405.

In act 405, the facility clusters the embedding space locations that resulted from iterations of act 403. In the result of this clustering operation, multiple clusters are identified, each likely corresponding to a different significant consideration for the category. For each cluster, the facility determines an embedding space location representing the cluster. In various embodiments, the facility selects the centroid of the cluster, or a mean point, median point, or mode point. In act 406, the facility uses the natural language transformer to de-project these embedding space locations of the subjective considerations in order to obtain a natural language name and/or natural language description of each subjective consideration. After 406, this process concludes.

FIG. 5 is a flow diagram showing a process performed by the facility in some embodiments to determine values of the subjective considerations for each item in a category. In acts 501-512, the facility loops through each reviewed item in the category. In act 502, the facility selects any reviews among the collected reviews that discuss the item. In some cases, a single review may be selected with respect to multiple items that it discusses. In acts 503-511, the facility loops through each of the considerations identified for the category. In acts 504-508, the facility loops through the reviews selected for the item in act 502. In act 505, the facility identifies any passages of the current review that address the current consideration. In act 606, the facility determines a sentiment of each of the passages identified in act 505. For example, in some embodiments, the facility uses sentiment analysis to determine whether each identified passage has a positive sentiment or a negative sentiment. For example, a positive sentiment of a particular passage would represent the review attributing a high value of the current consideration to the current item, while a negative sentiment would represent the review attributing a low value of the current consideration to the current item. In act 507, the facility aggregates the sentiments determined in act 506 of the identified passages, in order to obtain an overall sentiment for the review as a whole of the current consideration. In act 508, if additional selected reviews remain to be processed for the current item, then the facility continues in act 504 to process the next selected review, else the facility continues in act 509.

In act 509, the facility determines a value for the current consideration for the current item based on the number of reviews selected for the item whose overall sentiment for the consideration was positive, and the number whose overall sentiment was negative. For example, in some embodiments, the facility performs this determination by determining the percentage of selected reviews whose overall sentiment was positive with respect to the current consideration. In act 510, the facility stores the value determined in act 509 in the consideration value table for the combination of the current item and the current consideration. In act 511, if additional considerations remain to be processed for the current item, then the facility continues in act 503 to process the next consideration. In act 512, if additional items remain to be processed, then the facility continues in act 501 to process the next item, else this process concludes.

Figure 6:
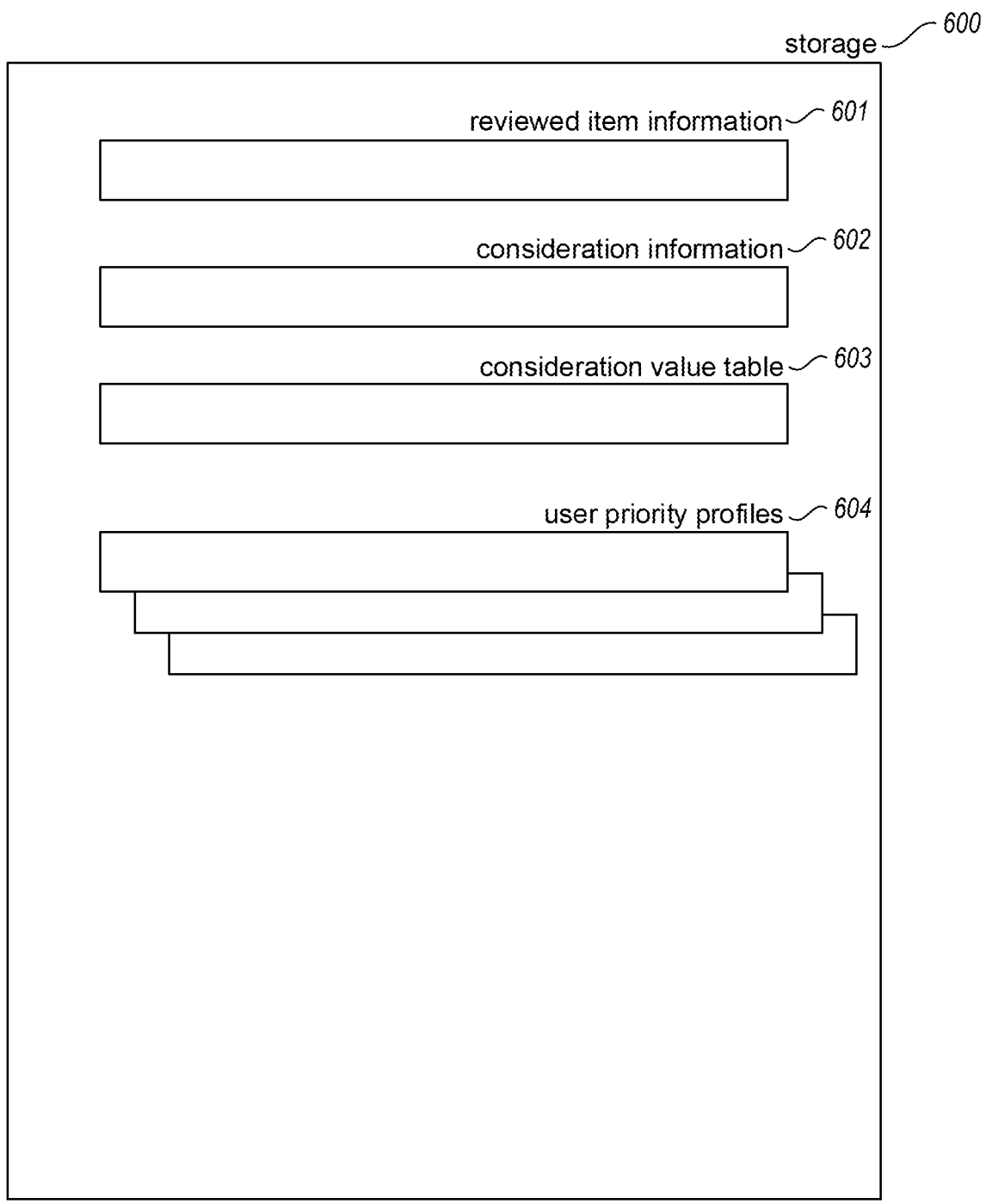
FIG. 6 is a data storage diagram showing state created and maintained by the facility in some embodiments.
Figure 11:
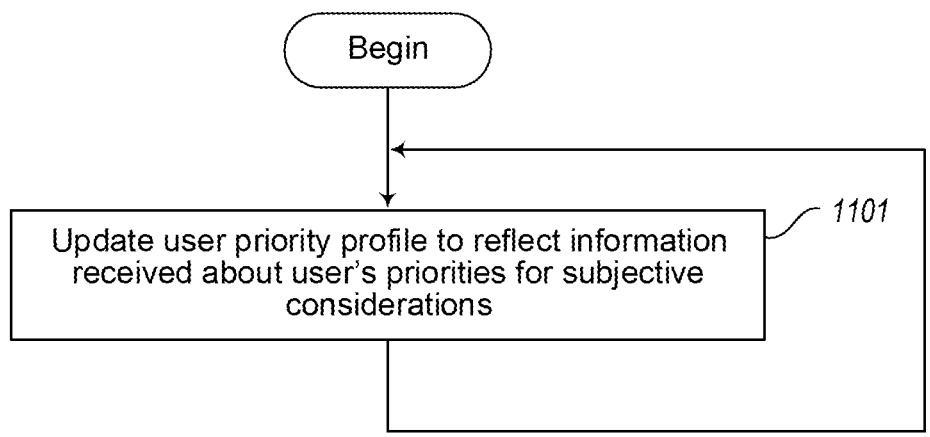
FIG. 11 is a flow diagram showing a process performed by the facility in some embodiments to maintain user priority profiles.

FIG. 6 is a data storage diagram showing state created and maintained by the facility in some embodiments. The figure shows storage 600, such as the memory 102, persistent storage 103, and/or computer-readable media drive 104 shown in FIG. 1. The storage contains information about the items in a category that are addressed by one or more of the item reviews collected by the facility for the category, such as, for each item, its name, a URL to an item detail page for the item, or a brochure for the item, objective attributes for the item, etc. The storage further contains consideration information 602 about the relevant considerations determined by the facility for the category, such as a textual name for the consideration, a textual description of the consideration, an embedding space location determined for the consideration, etc. The storage further contains a consideration value table 603 compiled by the facility by the storing performed in act 510 of FIG. 5. An example consideration value table is shown in FIG. 7 and discussed in greater detail below. The storage further includes user priority profiles 604 each containing, for a different user, information discerned by the facility about the kinds of considerations that are important or not important to that user. A process used by the facility in some embodiments to generate these profiles is shown in FIG. 11, and discussed in greater detail below.

FIG. 7 is a table diagram showing sample contents of a consideration value table used by the facility in some embodiments to store values of subjective considerations determined by the facility for each item in an item category. The consideration value table 700 is made up of rows, such as rows 701-703, each corresponding to a different item in a category, in this case items in the single-infant stroller category. Each row is divided into the following columns: an item ID column 711, containing an item ID uniquely identifying the item within the category; a maneuverability value 712 containing a value between 0 and 10 representing the extent to which the item satisfies the one-handed maneuverability consideration; a folding ease value column 713 containing a value representing the extent to which the item satisfies the ease of folding and unfolding consideration; a jogging stability value column 714 containing a value reflecting the extent to which the item satisfies the stability when jogging consideration; a seating position value column 715 containing a value reflecting the extent to which the item satisfies the comfortable seating position consideration; and a durability value column 716 containing a value reflecting the extent to which the item satisfies the durability consideration. For example, row 702 indicates that the single-infant stroller item having item ID 301923 has a value of 9 for the one-handed maneuverability consideration, a value of 2 for the ease of folding and unfolding consideration, a value of 8 for the stability when jogging consideration, a value of 5 for the comfortable seating position consideration, and a value of 4 for the durability consideration.

While FIG. 7 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, and/or indexed; may contain a much larger number of rows than shown, etc.

Specifically with respect to the consideration value table shown in FIG. 7, in some embodiments (not shown) the facility uses a larger group of tables to store this information. In some such embodiments, the facility uses an item table mapping between item ID and additional item information such as that shown as reviewed item information 601 in FIG. 6; a consideration table that maps between each of the considerations and a consideration ID uniquely identifying that consideration for the category; and a differently-organized consideration value table in which each row corresponds to a different combination of item ID and consideration ID, and maps between that combination and the value determined by the facility of that consideration for that item. For example, to be consistent with row 702 of consideration value table 700 shown, one row of the differently-organized consideration value table would contain the item ID 301923, a consideration ID representing the one-handed maneuverability consideration, and the consideration value 9.

Figure 8:
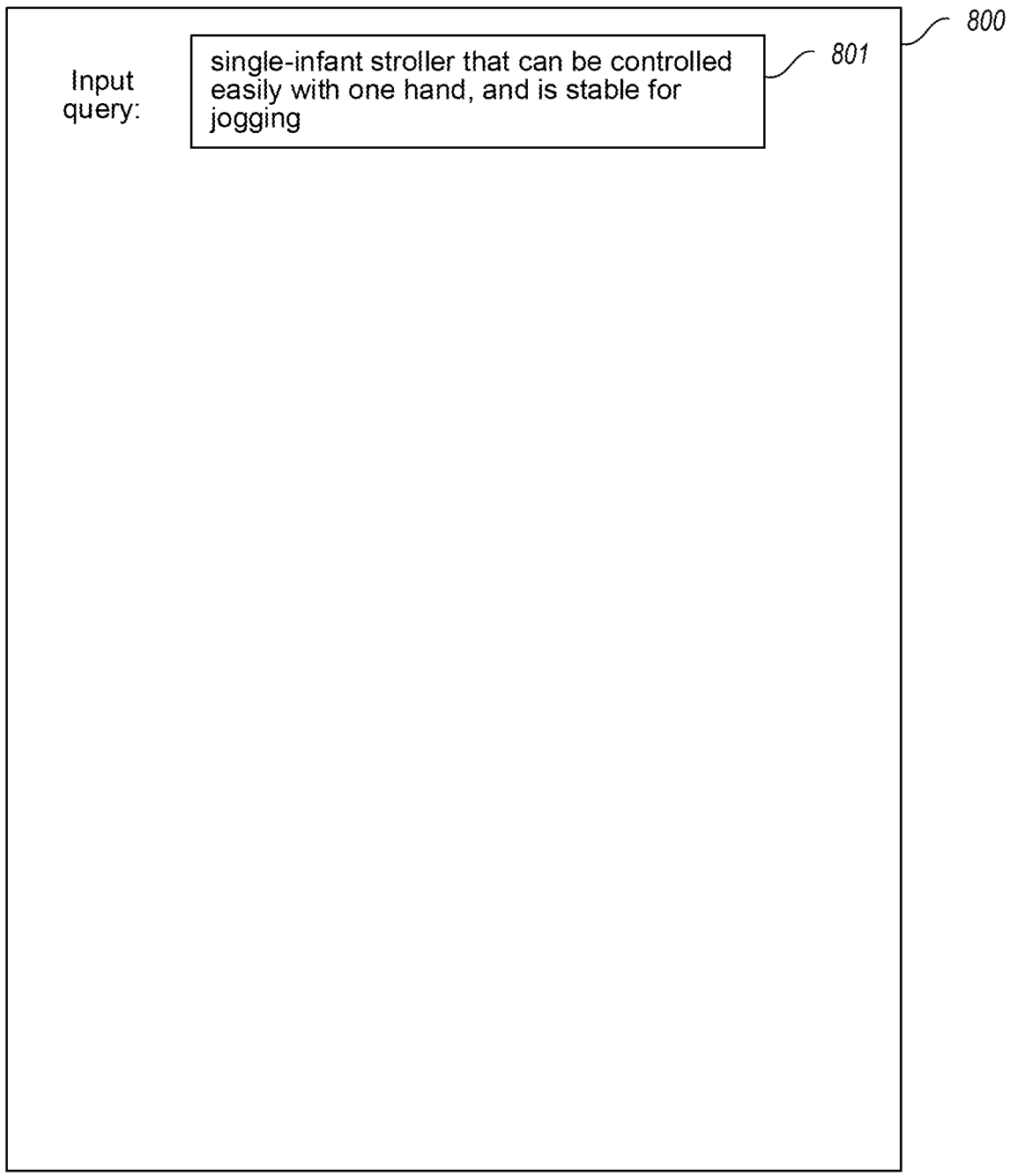
FIG. 8 is a display diagram showing a first sample display presented by the facility in some embodiments to receive a user request.

FIG. 8 is a display diagram showing a first sample display presented by the facility in some embodiments to receive a user request. The display 800 includes a field 801 into which the user inputs a textual query, such as by typing it, swiping it, pasting it, dictating it by voice, etc. In the case of the query shown in field 801, the user's consideration weighting is specified within the query, identifying the one-handed maneuverability and stability when jogging considerations as those important to the user. In some embodiments, the facility interprets this query as specifying a consideration weighting in which both of these two mentioned considerations have a weight of 100, and the remaining three considerations that are not mentioned have a weight of 0. In some embodiments, the facility performs additional analysis such as by considering adverbs and adjectives that qualify the considerations to assign more granular weights, i.e., those that can be other than 0 or 100.

While FIG. 8 and each of the display diagrams discussed below show a display whose formatting, organization, informational density, etc., is best suited to certain types of display devices, those skilled in the art will appreciate that actual displays presented by the facility may differ from those shown, in that they may be optimized for particular other display devices, or have shown visual elements omitted, visual elements not shown included, visual elements reorganized, reformatted, revisualized, or shown at different levels of magnification, etc.

Figure 9:
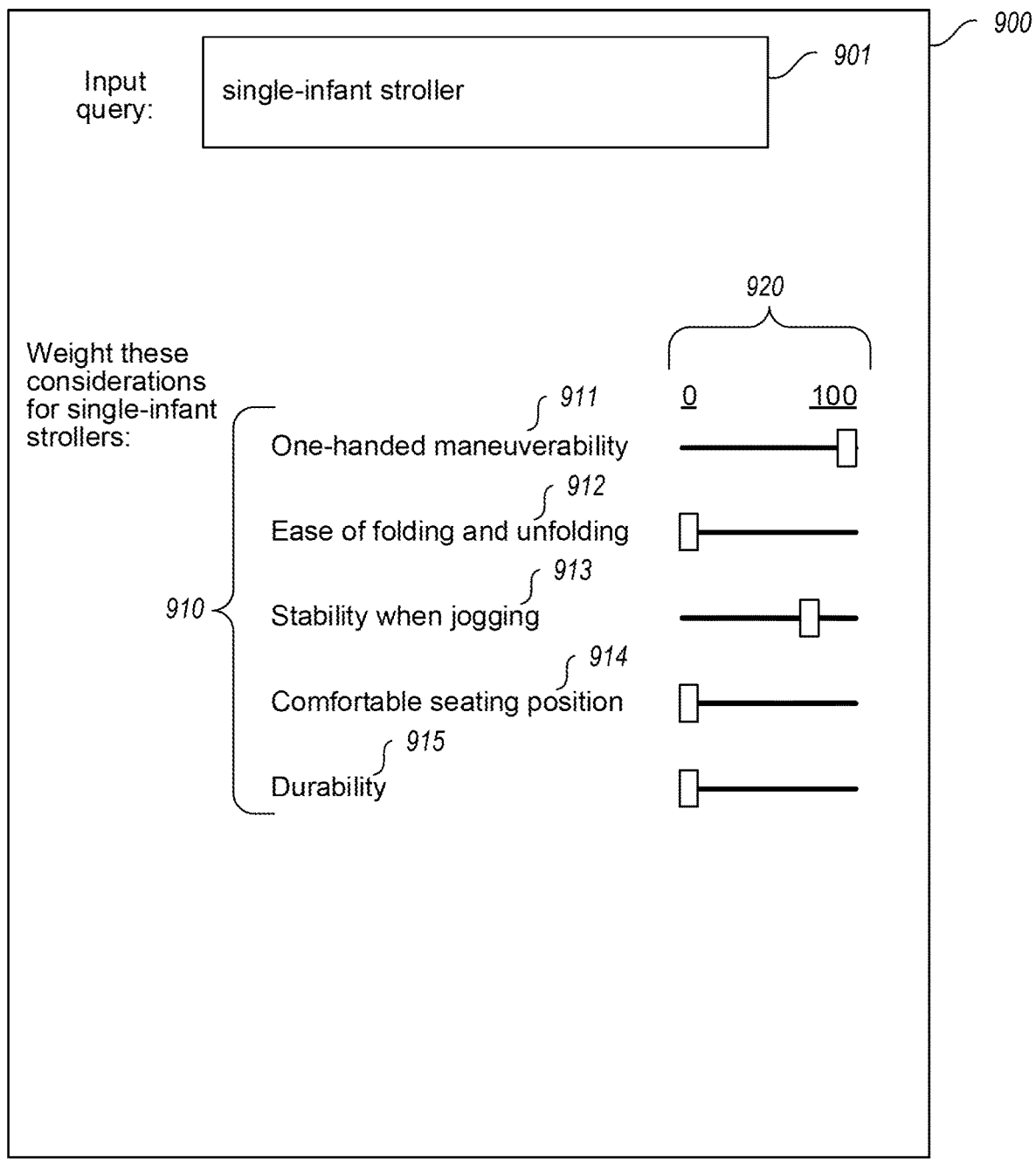
FIG. 9 is a display diagram showing a second sample user interface presented by the facility in some embodiments to receive a user request.

FIG. 9 is a display diagram showing a second sample user interface presented by the facility in some embodiments to receive a user request. The display 900 shows a query input field 901 into which user has typed a brief query that identifies the category, but does not indicate a consideration weighting. In response, the facility displays a list 910 of the considerations for this category, and controls 920 for specifying numerical weights for each consideration. It can be seen that the user has manipulated these controls to specify a weight of 100 for the one-handed maneuverability consideration, a weight of 80 for the stability when jogging consideration, and a weight of 0 for the remaining considerations.

As noted above, in some embodiments, no indication of a consideration weighting is submitted by the user with the query. In some embodiments, in such cases, the facility uses a consideration weighting that it determines for the query, such as by accessing a user preference profile maintained by the facility for the user. In some embodiments, the profile contains weights explicitly specified by the user for considerations in connection with earlier queries for the same category; in some embodiments, the facility uses weights specified for some or all of the considerations in connection with earlier queries in different categories that have those considerations in common, or have similar considerations; in some embodiments, the facility derives consideration weights from other actions performed by the user, such as a variety of item browsing, searching, acquiring, or reviewing actions.

Figure 10:
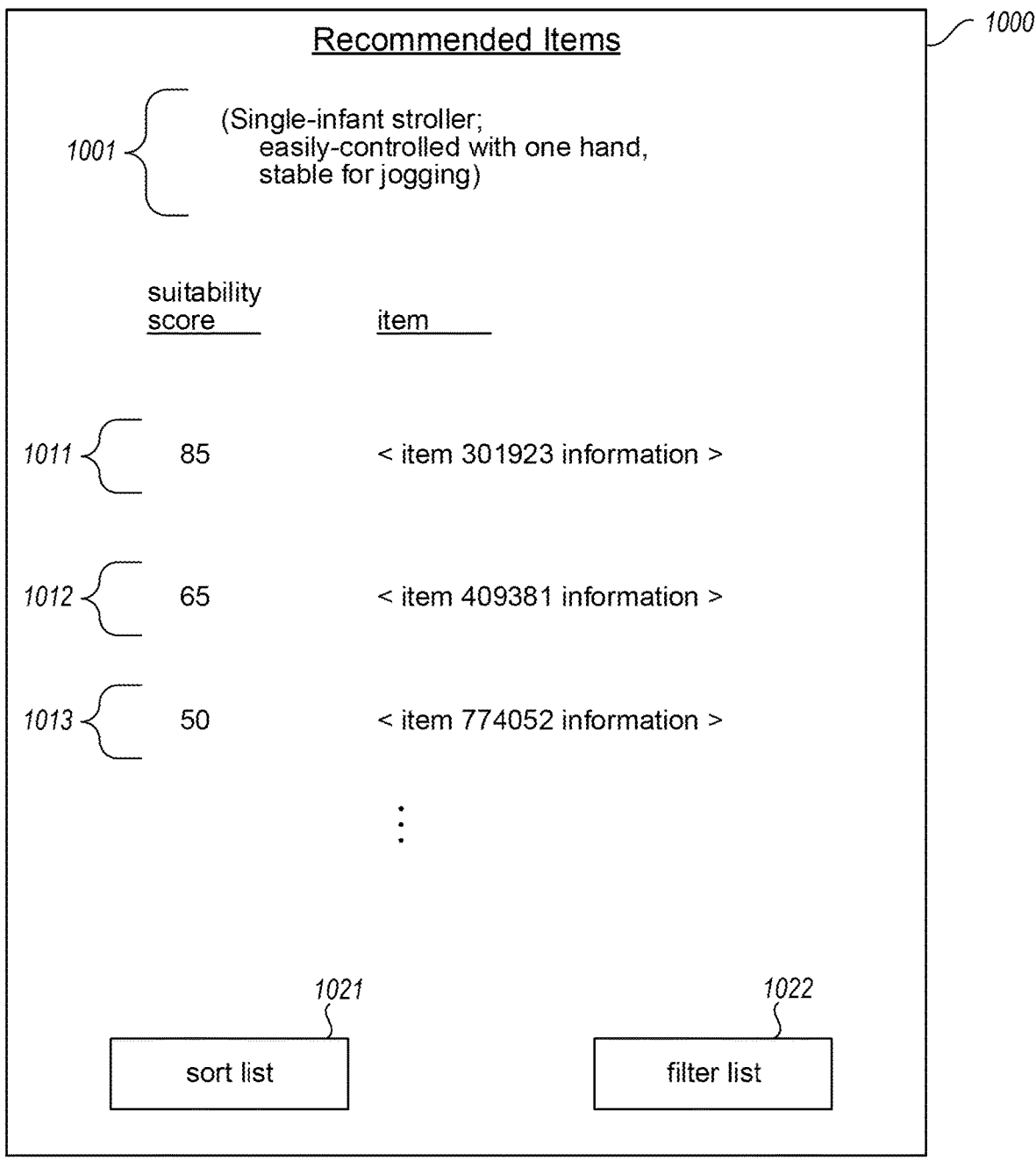
FIG. 10 is a display diagram showing a sample display presented by the facility in some embodiments to present a query result.

FIG. 10 is a display diagram showing a sample display presented by the facility in some embodiments to present a query result. The display 1000 includes a characterization 1001 of the query that includes both the query's category and highly-weighted considerations. The display further contains an ordered list of items such as items 1011-1013. As shown, the list of items is sorted in decreasing order of the suitability scores assigned to the items in response to the query. For each item, in various embodiments, the facility includes various information, such as the item's name, an image of the item, a link to an item detail page or other page containing additional information about the item, objective attributes of the item, a price for the item, a purchasing link for the item, and Add to Wish List control for the item, a checkout from library control for the item, etc. For example, row 1011 of the list indicates that the facility has determined a suitability score of 85—the top suitability score—for item 301923.

To further extend the example, the suitability scores shown in display 1000 are determined by the facility in accordance with the query shown in display 800—specifying consideration weights 100 for the one-handed maneuverability and stability when jogging considerations, and a weight of 0 for the remaining considerations-together with the item consideration values shown in consideration table value 700. In particular, the facility determines a suitability score of 85 for item 301923 by multiplying that item's maneuverability value of 9 by the weight 10, multiplying the jogging stability value of 8 by the weight 10, and averaging the resulting products of 90 and 80. Similarly, the facility determines the suitability score of 65 for item 409381 by multiplying that item's maneuverability value of 6 by the weight of 10, multiplying its jogging stability value of 7 by the weight of 10, and averaging the resulting products of 60 and 70. It can be seen in the consideration value table 700 that, while item 290314 has significantly higher values of the folding ease, seating position, and durability considerations, because these are weighted lowly for the query, the suitability score determined for this item by the facility is much lower-only 15. On the other hand, item 290314 will be more highly-featured—with a significantly higher suitability score—for users that place greater value on these other considerations.

Display 1000 also contains a sort list control 1021 that the user can activate in order to perform a different sort of the list-such as using one or more objective attributes like price or weight, as well as a filter list control 1022 that the user can activate in order to filter the list based upon, for example, a minimum suitability score, or values of any available objective attributes.

FIG. 11 is a flow diagram showing a process performed by the facility in some embodiments to maintain user priority profiles. In act 1101, the facility uses information that it receives about a user's priorities about subjective considerations to update the user priority profile. In various embodiments, this information can reflect weights explicitly specified by the user for considerations in connection with earlier queries for the same category; in some embodiments, the facility uses weights specified for some or all of the considerations in connection with earlier queries in different categories that have those considerations in common, or have similar considerations; in some embodiments, the facility derives consideration weights from other actions performed by the user, such as a variety of item browsing, searching, acquiring, or reviewing actions. This information may be received by the facility in connection with the facility's own active monitoring of this information, and/or as a result of the facility registering to receive this information from external tools and/or systems. After act 1101, the facility continues in act 1101 to update user priority profiles for further received information.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more instances of computer-readable media, not constituting a transitory propagating data signal, collectively having contents configured to cause a computing system to perform a method, the method comprising:
   accessing a plurality of textual reviews each of an item among a plurality of items in a distinguished category;
   applying a first large language model to the accessed reviews to identify a plurality of subjective considerations applied to items among the plurality of items in the distinguished category;
   applying a second large language model to the accessed reviews to select portions each referencing one of the plurality of subjective considerations;
   performing automatic sentiment analysis on each selected portion to obtain a sentiment analysis result for each selected portion;
   for each respective subjective consideration of the plurality of subjective considerations, for each item to which the respective subjective consideration is applied, generating a value for the respective subjective consideration based on the sentiment analysis result for each selected portion mentioning the respective subjective consideration in reviews of the item;
   receiving a plurality of requests each on behalf of a distinguished user;
   in response to each received request:
      for each respective subjective consideration of the plurality of subjective considerations, determining an importance weight for a combination of the respective subjective consideration and the distinguished user;
      for each respective item of the plurality of items in the distinguished category, combining values for subjective considerations with importance weights determined for the distinguished user to determine a suitability score of the respective item for the distinguished user; and
      causing visual indications of at least a portion of the plurality of items in the distinguished category to be displayed to the distinguished user in a manner determined based upon the suitability scores determined for the at least the portion of the plurality of items.

2. The one or more instances of computer-readable media of claim 1 wherein the first and second large language models are the same large language model.

3. A method in a computing system, the method comprising:
   accessing a plurality of textual reviews each of an item among a plurality of items in a distinguished item category;
   applying a large language model to the accessed reviews to identify a plurality of subjective considerations for the plurality of items in the distinguished item category;
   applying a large language model to the accessed reviews to select portions each mentioning one of the identified plurality of subjective considerations;
   performing automatic sentiment analysis on each selected portion;
   for each respective subjective consideration of the plurality of subjective considerations, for each respective item of the plurality of items in the distinguished item category, generating a value for the respective subjective consideration based on a sentiment analysis result for portions mentioning the respective subjective consideration in reviews of the respective item; and
   storing the generated values.

4. The method of claim 3, further comprising using the generated values to score items among the plurality of items based upon weightings for the plurality of subjective considerations.

5. One or more instances of computer-readable media, not constituting a transitory propagating data signal, collectively having contents configured to cause a computing system to perform a method, the method comprising:
   receiving a request identifying an item category;
   in response to receiving the request:

for each respective subjective consideration of a plurality of subjective considerations identified for the identified item category:
  determining a weight for the respective subjective consideration;
  for each respective item of a plurality of items in the item category identified by the request:
    accessing a value for the respective subjective consideration generated based upon analysis of textual reviews of the respective item by a large language model; and
  for each respective item of the plurality of items in the item category identified by the request:
    determining a score for the respective item by combining the accessed subjective consideration value in accordance with the weight determined for the respective subjective consideration; and
causing indications of at least a portion of the plurality of items in the item category identified by the request to be displayed in a way that is responsive to the scores determined for the portion of the items.

6. The one or more instances of computer-readable media of claim 5 wherein determining a weight for each respective subjective consideration comprises determining the weights based upon contents of the request.

7. The one or more instances of computer-readable media of claim 5 wherein the method further comprises:
causing to be displayed visual indications of one or more of the plurality of subjective considerations identified for the identified item category; and
receiving user input with respect to the displayed visual indications specifying weights of the one or more subjective considerations indicated by the displayed visual indications, and wherein weights for each respective subjective consideration of the plurality of subjective considerations are determined in accordance with the weights specified by the received user input.

8. The one or more instances of computer-readable media of claim 5 wherein the received request is received on behalf of a distinguished user, and wherein the method further comprises:
inferring the determined weights for the subjective considerations based upon actions taken by the distinguished user that are separate from the received request.

9. The one or more instances of computer-readable media of claim 5 wherein the received request is received on behalf of a distinguished user, and wherein the method further comprises:
retrieving the determined weights for the subjective considerations from a priority profile maintained for the distinguished user.

10. A method in a computing system, the method comprising:
accessing a plurality of textual reviews each of an item among a plurality of items in a distinguished category;
applying a large language model to the accessed reviews to select portions each mentioning one of a plurality of subjective considerations identified for the distinguished category;
performing automatic sentiment analysis on each selected portion;
for each respective subjective consideration of the plurality of subjective considerations, for each item, generating a value for the respective subjective consideration based on an automatic sentiment analysis result for at least one portion mentioning the respective subjective consideration in reviews of the item;
on behalf of a distinguished user:
  for each respective subjective consideration of the plurality of subjective considerations, accessing an importance weight for a combination of the respective subjective consideration and the distinguished user; and
  for each of at least a portion of the plurality of items in the distinguished category, determining a suitability score of the item for the distinguished user.

11. The method of claim 10, further comprising applying the large language model to the accessed reviews to identify the plurality of subjective considerations for the distinguished category.

12. The method of claim 10, further comprising receiving input from the distinguished user specifying the accessed importance weights.

13. The method of claim 10, further comprising:
inferring the accessed importance weights for the subjective considerations based upon actions taken by the distinguished user that are separate from a received request.

14. The method of claim 10, further comprising:
retrieving the accessed importance weights for the subjective considerations from a priority profile maintained for the distinguished user.

15. The method of claim 10, further comprising, for each of the at least a portion of the plurality of items in the distinguished category, causing to be displayed:
information identifying the item; and
an indication of the suitability score determined for the item.

16. The method of claim 10, further comprising causing to be displayed a plurality of entries each corresponding to an item of the plurality of items in the distinguished category, each entry comprising information identifying the item to which the entry corresponds, the entries appearing in an order that is based on a suitability score determined for the item to which each entry corresponds.

17. The method of claim 10, further comprising causing to be displayed a plurality of entries each corresponding to an item of the plurality of items in the distinguished category, each entry comprising information identifying the item to which the entry corresponds, the entries being filtered based on a suitability score determined for the item to which each entry corresponds.

* * * * *